US006876728B2

(12) United States Patent
Kredo et al.

(10) Patent No.: US 6,876,728 B2
(45) Date of Patent: Apr. 5, 2005

(54) INSTANT MESSAGING USING A WIRELESS INTERFACE

(75) Inventors: Thomas J. Kredo, Rochester, NY (US); Margaret Avino, Pittsford, NY (US); Richard Bergman, Williamson, NY (US)

(73) Assignee: Nortel Networks Limited, St. Laurent (CA)

( * ) Notice: Subject to any disclaimer, the term of this patent is extended or adjusted under 35 U.S.C. 154(b) by 89 days.

(21) Appl. No.: 09/897,239

(22) Filed: Jul. 2, 2001

(65) Prior Publication Data

US 2003/0002633 A1 Jan. 2, 2003

(51) Int. Cl.[7] .............................................. H04M 1/64
(52) U.S. Cl. ............................. 379/88.17; 379/93.15; 704/254
(58) Field of Search ..................... 379/67.1, 88.02, 379/88.14, 88.17, 88.01; 345/751, 738, 760, 968, 739; 707/3; 709/207, 203, 217, 218, 219

(56) References Cited

U.S. PATENT DOCUMENTS

| | | | |
|---|---|---|---|
| 5,327,521 A | 7/1994 | Savic et al. ................. 395/2.81 |
| 5,347,306 A | 9/1994 | Nitta ........................... 348/15 |
| 5,353,335 A | 10/1994 | D'Urso et al. ................ 379/67 |
| 5,541,981 A * | 7/1996 | Lynn ........................... 246/124 |
| 5,586,171 A | 12/1996 | McAllister et al. ........... 379/67 |
| 5,652,789 A | 7/1997 | Miner et al. ................. 379/201 |
| 5,749,073 A | 5/1998 | Slaney ........................ 704/278 |
| 5,812,126 A | 9/1998 | Richardson et al. ........ 345/230 |
| 5,812,972 A | 9/1998 | Juang et al. ................. 704/234 |
| 5,818,836 A | 10/1998 | DuVal ........................ 370/389 |
| 5,835,568 A | 11/1998 | Bass et al. .................... 379/67 |
| 5,848,134 A | 12/1998 | Sekiguchi et al. ........ 379/93.15 |
| 5,860,064 A | 1/1999 | Henton ....................... 704/260 |
| 5,864,848 A * | 1/1999 | Horvitz et al. ................. 707/6 |
| 5,870,709 A | 2/1999 | Bernstein .................... 704/275 |
| 5,875,427 A | 2/1999 | Yamazaki ................... 704/258 |
| 5,880,731 A | 3/1999 | Liles et al. .................. 345/349 |
| 5,884,029 A | 3/1999 | Brush, II et al. ........ 395/200.32 |
| 5,884,262 A | 3/1999 | Wise et al. .................. 704/270 |
| 5,890,115 A | 3/1999 | Cole ........................... 704/258 |
| 5,911,129 A | 6/1999 | Towell ........................ 704/272 |
| 5,933,805 A | 8/1999 | Boss et al. .................. 704/249 |
| 6,111,937 A | 8/2000 | Kuroiwa et al. .......... 379/88.06 |
| 6,226,361 B1 | 5/2001 | Koyama .................. 379/88.07 |
| 6,314,094 B1 * | 11/2001 | Boys .......................... 370/352 |
| 6,317,486 B1 | 11/2001 | Hollins et al. ........... 379/88.23 |
| 6,366,651 B1 * | 4/2002 | Griffith et al. .......... 379/100.13 |
| 6,389,114 B1 * | 5/2002 | Dowens et al. ............... 379/52 |
| 6,424,935 B1 * | 7/2002 | Taylor ......................... 704/10 |
| 6,446,076 B1 * | 9/2002 | Burkey et al. ............. 704/270 |
| 6,449,365 B1 * | 9/2002 | Hodges et al. ............. 379/9.02 |
| 6,453,294 B1 * | 9/2002 | Dutta et al. .............. 704/270.1 |

FOREIGN PATENT DOCUMENTS

WO   WO 01/35615 A2   5/2001   ............ H04M/3/00

OTHER PUBLICATIONS

The Effect Of Emotional icons On Remote Communication; Krisela Rivera et al, New Mexico State University, Department of Psychology, Las Cruces, NM 88003, Apr. 13–18, 1996, CHI 96 Interactive Posters.*

* cited by examiner

Primary Examiner—Fan Tsang
(74) Attorney, Agent, or Firm—Withrow & Terranova, PLLC

(57) ABSTRACT

The present invention allows telephony users and on-line users to communicate with one another using an instant messaging (IM) service. The on-line user will provide and receive textual messages, wherein the telephony user will provide and receive corresponding audible messages. These messages may convey emotion using associated emotional indicia, such as emoticons, or other emotional indicia, including the use of capitalization, emphasis, and the like. Emotional indicia provided in the text messages from the on-line user are audibly conveyed to the telephony user. Similarly, emotional indicia provided by the telephony user in the form of actual emotions or commands are provided in text to the on-line user.

24 Claims, 9 Drawing Sheets

EXAMPLE PHRASE COMPONENT PROFILE

| VOLUME | SAY PERSONALITY | SAY EMOTION | SAY MEANING |
|---|---|---|---|
| • LOUD<br>• NORMAL<br>• SOFT | • RAP<br>• INDIES<br>• WEST COAST<br>• EAST COAST<br>• BUSINESS<br>• CHILD | • ANGER<br>• DESPAIR<br>• SADNESS<br>• SARCASM<br>• LOVE<br>• BORED<br>• HAPPY<br>• NEUTRAL<br>• DISGUSTED<br>• KIDDING | • HI<br>• EXPLAIN<br>• SAY AGAIN<br>• NO<br>• YES<br>• GOOD<br>• BAD<br>• HMMMM<br>• CALL ME<br>• JOKE |

*FIG. 2*

PHRASE DEFINITION PROFILE

| EMOTION | MEANING | | | | | | | | | |
|---|---|---|---|---|---|---|---|---|---|---|
| | HI | EXPLAIN | SAY AGAIN | YES | NO | GOOD | BAD | CALL ME | JOKE | HMMMM |
| ANGER | 1 | 2 | 3 | 4 | 5 | 6 | 7 | 8 | 9 | 10 |
| DESPAIR | 11 | 12 | 13 | 14 | 15 | 16 | 17 | 18 | 19 | 20 |
| SADNESS | 21 | 22 | 23 | 24 | 25 | 26 | 27 | 28 | 29 | 30 |
| SARCASM | 31 | 32 | 33 | 34 | 35 | 36 | 37 | 38 | 39 | 40 |
| LOVE | 41 | 42 | 43 | 44 | 45 | 46 | 47 | 48 | 49 | 50 |
| BORED | 51 | 52 | 53 | 54 | 55 | 56 | 57 | 58 | 59 | 60 |
| HAPPY | 61 | 62 | 63 | 64 | 65 | 66 | 67 | 68 | 69 | 70 |
| NEUTRAL | 71 | 72 | 73 | 74 | 75 | 76 | 77 | 78 | 79 | 80 |
| DISGUSTED | 81 | 82 | 83 | 84 | 85 | 86 | 87 | 88 | 89 | 90 |
| KIDDING | 91 | 92 | 93 | 94 | 95 | 96 | 97 | 98 | 99 | 100 |

*FIG. 3*

PHRASE SELECTION PROFILE

EAST COAST STYLE PROFILE

| PHRASE NUMBER | TEXT PHRASE WITH EMOTION | |
|---|---|---|
| | NORMAL VOLUME | LOUD VOLUME |
| 1. ANGER.HI. | "Hey Jerk" :-@ | :O "HEY JERK" :-@ |
| 11. DESPAIR.HI | "Hi. It's been so long." :-C | :O "HI. IT'S BEEN SO LONG." :-C |
| 21. SADNESS.HI | "Hi. Not doing well right now." :-( | :O "HI. NOT DOING WELL RIGHT NOW." :-( |
| 31. SARCASM.HI | "Hi. Really GOOD to See You." :-> | :O "HI. REALLY GOOD TO SEE YOU." :-> |
| 41. LOVE.HI | "Hi Love" :* | :O "HI LOVE" :* |
| 51. BORED.HI | "Hi Ho Hum" |-O | :O "HI HO HUM" |-O |
| 61. HAPPY.HI | "Hello. Hello. Hello." :-) | :O "HELLO. HELLO. HELLO." :-) |
| 71. NEUTRAL.HI | "Hello" :| | :O "HELLO" :| |
| 81. DISGUSTED.HI | "Hi to you." :-| | :O "HI TO YOU." :-| |
| 91. KIDDING.HI | "Hi and Low" :D | :O "HI AND LOW" :D |

*FIG. 4*

INSTANT MESSAGING USING A WIRELESS INTERFACE

FIELD OF THE INVENTION

The present invention relates to facilitating communications between a telephony user and an on-line user, and in particular, relates to facilitating instant messaging between these users.

BACKGROUND OF THE INVENTION

The rapid acceptance of the Internet has changed the way in which people communicate. A significant number of letters and telephone calls have been replaced with email messages. Although email is an effective communication medium, ongoing on-line communications are often hampered because of the extra steps necessary to view, reply, and send email messages. Further, email provides no way of knowing if the person with whom someone is communicating is on-line at that particular moment. With these deficiencies, instant messaging (IM) has gained great popularity over email to facilitate ongoing on-line communications.

Typically, IM allows users to form a list of people with whom they wish to communicate. This list is typically called a "buddy list," and most IM services allow users to communicate with anyone on their buddy list, assuming that the person is on-line at that given time. Generally, users will send an alert to those persons on their buddy list who are on-line prior to engaging in a conversation. Most IM services provide a small text window where two or more users can type messages that both users can instantly view. IM services not only allow users to send notes back and forth while on-line, they can also allow users to set up chat rooms to communicate with groups of users, and to share links to web sites as well as images, audio, and the like.

With the increasing popularity of IM, as well as email, users continue to develop shortcuts for conveying words, phrases, and emotions to make these text-based communications more efficient and fluent. These shortcuts may include the use of acronyms, abbreviations, symbols, or combinations thereof. Given the difficulty in communicating emotion with written communications, a growing set of accepted symbols for emotions often punctuates these text-based messages. For example, a :) or :(can easily convey whether a sender of a message is happy or sad, respectively.

Given the wide acceptance of IM, there is a need to support IM between traditional on-line users and traditional land-based or wireless telephony users, who are restricted to using voice to send messages and to receiving audible messages. Further, there is a need to maintain the integrity of IM by conveying emotion and like characters with the messages between the on-line and telephony users.

SUMMARY OF THE INVENTION

The present invention allows telephony users and on-line users to communicate with one another using an instant messaging (IM) service. The on-line IM user will provide and receive textual messages, wherein the telephony user will provide and receive corresponding audible messages. These messages may convey emotion using associated emotional indicia, such as emoticons, or other emotional indicia, including the use of capitalization, emphasis, and the like. Emotional indicia provided in the text messages from the on-line IM user are audibly conveyed to the telephony user. Similarly, emotional indicia provided by the telephony user in the form of actual emotions or commands are provided in text to the on-line IM user.

In one configuration, an IM proxy server is used to act as a liaison between a traditional IM service supported through an IM proxy server and the telephony user. In essence, the IM server effectively treats the IM proxy server as a second on-line user. The IM proxy server interacts with an audio browser to communicate with the telephony user via a telephony network and act as a proxy on behalf of the telephony user for the IM server.

The audio browser effectively translates speech to text for messages directed to the on-line IM user and translates text to speech for messages received from the on-line user and directed to the telephony user. The IM proxy server interacts with the audio browser to receive text converted from audio from the telephony user and provides an equivalent instant message to the IM server for delivery to the on-line IM user.

Similarly, messages directed to the telephony user via a mobile terminal or the like and received by the IM server from the online IM user are forwarded to the IM proxy server. The IM proxy server will process the message to form a text-based message ready for conversion to an audio format. The processed message is sent to the audio browser, which converts the message to an audio format and delivers it to the mobile terminal. As such, the audio browser provides text-to-speech and speech-to-text conversion to facilitate communications between the IM proxy server and the mobile terminal. The IM proxy server translates text messages to and from other text messages in a manner consistent with instant messaging.

In operation, the audio browser will receive a message and convert audible commands within the message for processing by the IM proxy server. The commands will include a meaning and be associated with one or more characteristics. Notably, various characteristics may be sent with each message, or pre-established for all messages. Characteristics may include a relative volume for conveying the message; a type of personality, nationality, or ethnicity; and an emotion to associate with the meaning of the message.

The IM proxy server will receive the command derived from the audio message and create an instant message based on the message meaning and any associated characteristics. The instant message is then delivered to the online IM user via the IM server.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 2 is a table providing an example phrase component profile according to a preferred embodiment of the present invention.

FIG. 3 is a table providing an example phrase definition profile according to a preferred embodiment of the present invention.

FIG. 4 is a table providing an example phrase selection profile according to a preferred embodiment of the present invention.

Figure 9A:
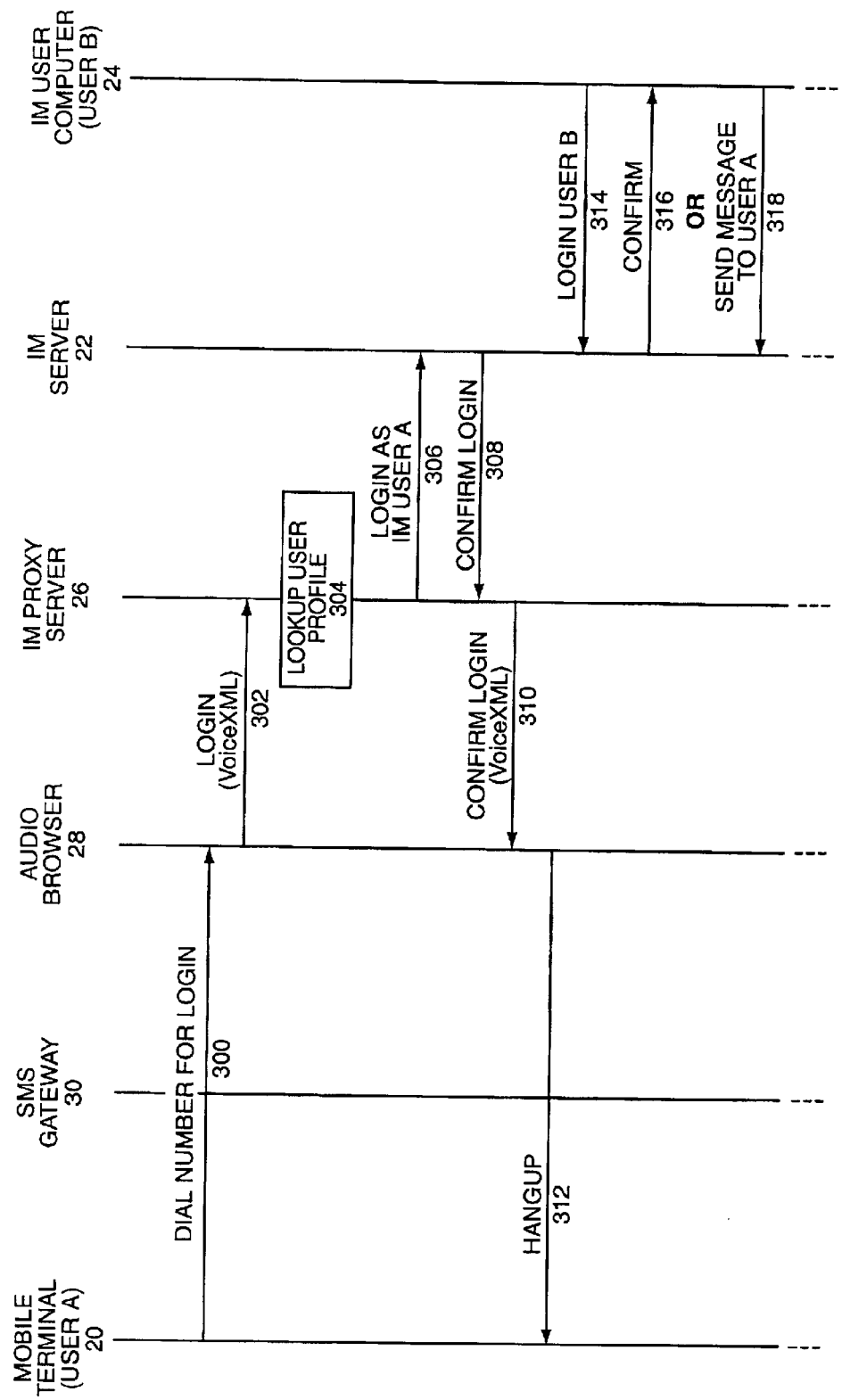
Figure 9B:
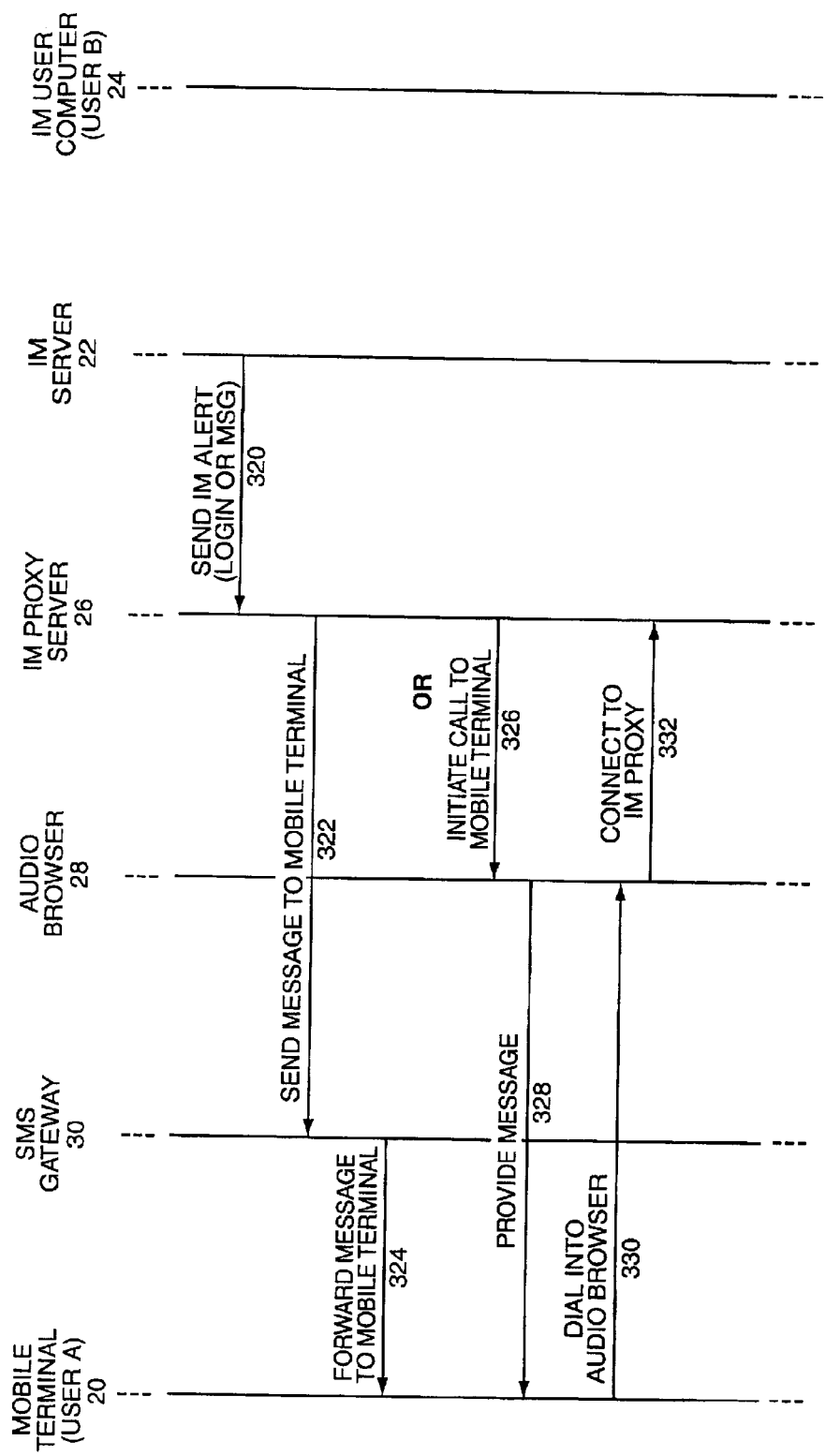
Figure 9C:
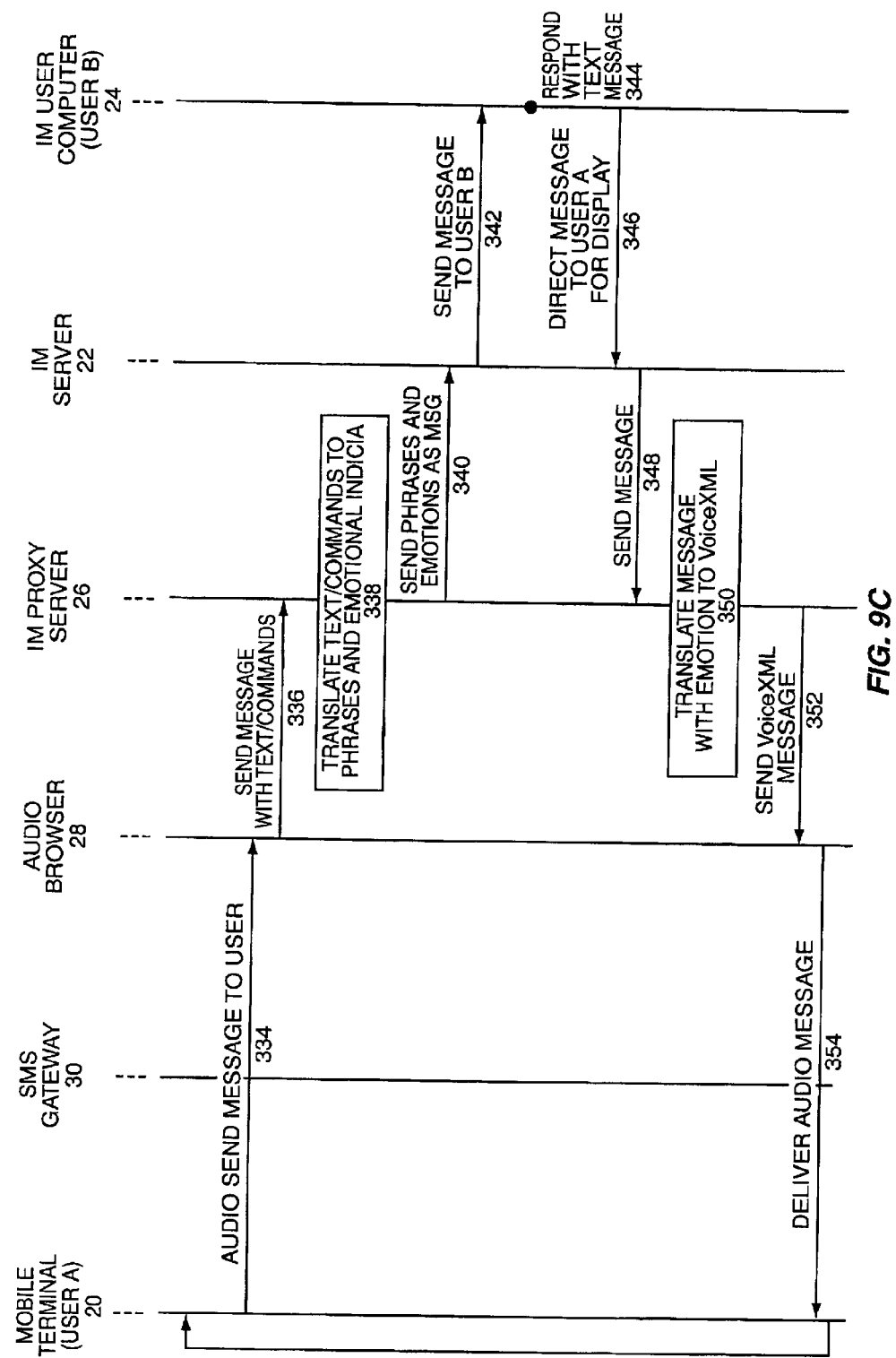

FIGS. 9A, 9B, and 9C show a communication flow diagram outlining an exemplary process according to a preferred embodiment of the present invention.

DETAILED DESCRIPTION OF THE PREFERRED EMBODIMENTS

The present invention allows telephony users and on-line users to communicate with one another using an instant messaging (IM) service. The on-line user will provide and receive textual messages, wherein the telephony user will provide and receive corresponding audible messages. These messages may convey emotion using associated emotional indicia, such as emoticons, or other emotional indicia, including the use of capitalization, emphasis, and the like. Emotional indicia provided in the text messages from the on-line user are audibly conveyed to the telephony user. Similarly, emotional indicia provided by the telephony user in the form of actual emotions or commands are provided in text to the on-line user. In one configuration, a proxy is used to act as a liaison between a traditional IM service and the telephony user. A detailed description of the preferred embodiments follows.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
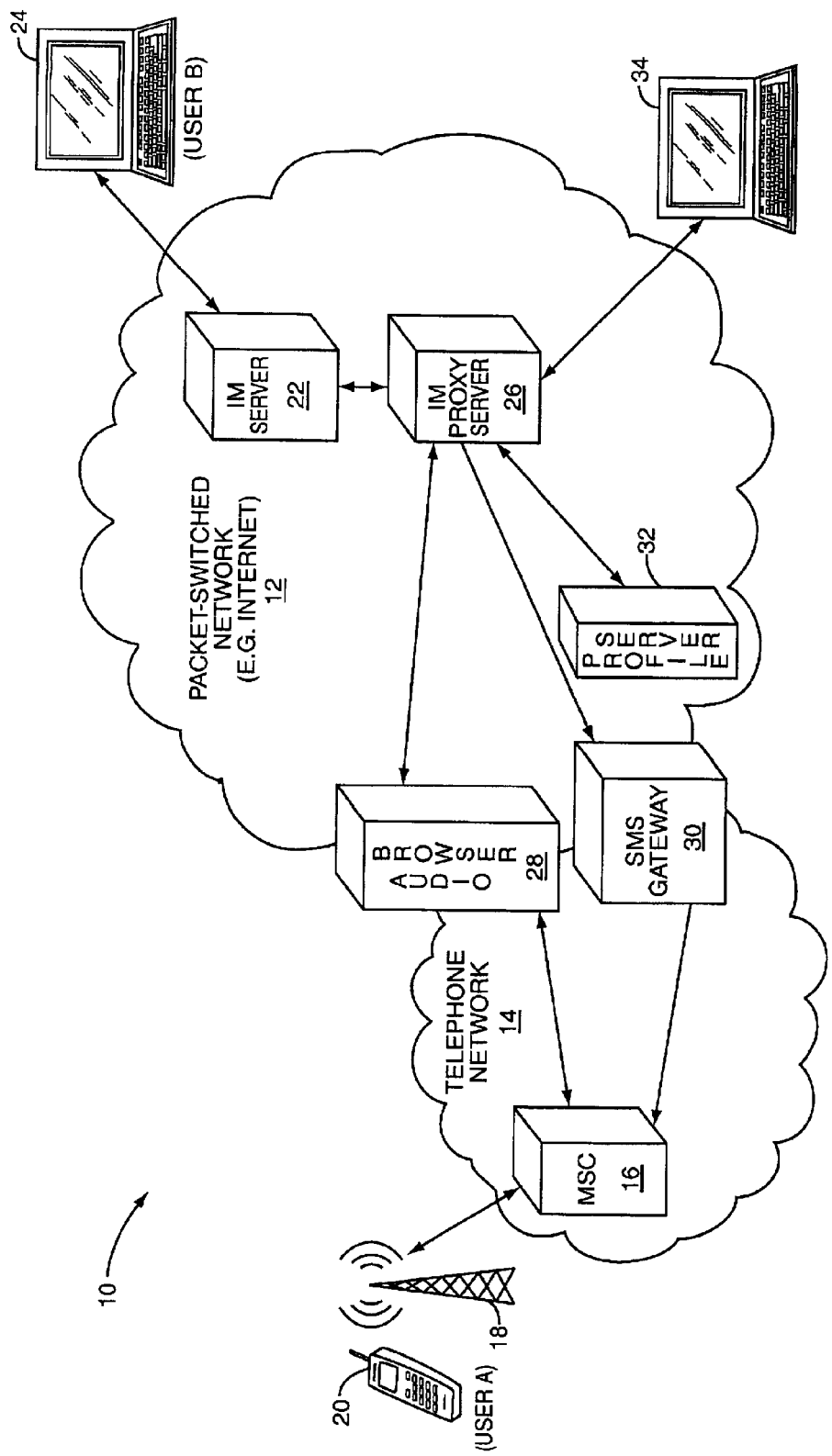
FIG. 1 depicts a communication environment sufficient to support a preferred embodiment of the present invention.

Turning now to FIG. 1, an exemplary communication environment 10 is illustrated. The communication environment 10 will include a packet-switched network 12, such as the Internet, and a circuit-switched telephone network 14, such as the public switched telephone network (PSTN), wireless telephone network, or combination thereof. For the purposes of describing the preferred embodiments of the present invention, a wireless telephone network 14 is described. Those skilled in the art will recognize the applicability of the present invention to land-based telephony communications in addition to mobile communications.

Assuming that the circuit-switched telephone network 14 is capable of facilitating mobile communications, a mobile switching center (MSC) 16 will typically communicate with base station 18. The base station 18 will support wireless communications with a mobile terminal 20, such as a mobile telephone or personal digital assistant (PDA).

In the packet-switched network 12, IM services are provided by IM server 22. Traditionally, the IM server 22 processes messages sent between users. For example, a text-based user B will use a computer 24 to generate and send instant messages for delivery to another user to the IM server 22. The IM server 22 will facilitate the delivery of the message to the other user for viewing. Similarly, messages directed to user B are sent to the IM server 22 and forwarded to user B's computer 24.

With the present invention, a telephony user A is allowed to participate in an IM session without negatively impacting or causing the need for modification in the IM functions provided by the IM server 22. Typically, an IM proxy server 26 acts as a liaison between the IM server 22 and the telephony user A. In essence, the IM server 22 will effectively treat the IM proxy server 26 as the telephony user A. The IM proxy server 26 interacts with an audio browser 28 to communicate with the telephony user A through telephony network 14 and act as a proxy for the IM server 22 on behalf of the telephony user A. As will be discussed in greater detail below, the audio browser 28 effectively translates speech to text for incoming messages from the telephony user A and translates text to speech for messages directed to the telephony user A.

The IM proxy server 26 interacts with the audio browser 28 to receive text converted from audio from the telephony user A and provide equivalent instant messages to the IM server 22 for delivery to the computer 24 of user B. Similarly, messages directed to the mobile terminal 20 and received by telephony user A from the computer 24 of user B are sent to the IM server 22 and forwarded to the IM proxy server 26. The IM proxy server 26 will process the message to form a text-based message ready for conversion to an audio format. The processed message is sent to the audio browser 28, which converts the message to an audio format and delivers it to the mobile terminal 20. As such, the audio browser 28 provides text-to-speech and speech-to-text conversion to facilitate communications between the IM proxy server 26 and the mobile terminal 20. The IM proxy server 26 translates text messages to and from other text messages in a manner consistent with instant messaging. Further detail is provided below.

Continuing with FIG. 1, a short message service (SMS) gateway 30 or like system may be used to send alerts, instructions, or the like to the mobile terminal 20 outside of the IM services. These secondary messages may be used to simply alert the telephony user A that someone has joined the IM session or that a message is available for delivery to the mobile terminal 20. The SMS gateway 30 or like service is intended as a secondary message delivery medium to facilitate use of the IM capability of the present invention.

The telephony user A may establish various profiles, as described below, to guide and facilitate IM when using the mobile terminal 20. These profiles are preferably created and stored on a profile server 32 capable of communicating with the IM proxy server 26. Telephony user A may access the profile server 32 using a personal computer 34 or like computing device.

IM messages are typically short, abbreviated strings of text capable of conveying a certain meaning, and preferably associated with characteristics of the sender of the message. These characteristics relate to the emotional state or personality of the sender, as well as any particular emphasis associated with a given message. Thus, an important aspect of IM is the ability to effectively communicate these characteristics. Unfortunately, existing speech recognition systems are not capable of conveying these characteristics. Further, speech recognition technology remains an imperfect technology, and has proven difficult to effectively translate real-time speech to text and vice versa. However, speech recognition technology is effective and reliable in recognizing pre-defined words and phrases permitting the formation of a limited vocabulary or language.

The present invention effectively blends the defined IM vocabulary and language with voice recognition technology to facilitate IM between audible and text-based communications. Accordingly, one embodiment of the present invention establishes a profile to govern communications between the telephony user A and the text-based user B. Preferably, a first conversion configuration is provided to convert messages from the telephony user A to an IM format for delivery to the on-line user B via the IM server 22. The IM proxy server 26 provides this service, wherein the audio browser 28 simply converts audible commands received from the user A to corresponding text, which is sent to the IM proxy server 26 for processing. Instant messages directed to the telephony user A from the on-line user B are directed to the IM proxy server 26 via the IM server 22 for conversion to a text format, which is readily converted to audio upon being sent to the audio browser 28. As noted, the audio browser 28 will translate the audible message from the telephony user A. To facilitate these conversions, messages received from the telephony user A will take the form of a command, which includes a message meaning and defines one or more characteristics.

Notably, various characteristics may be sent with each message, pre-established for all messages, or a combination thereof. The table of FIG. 2 defines various components corresponding to a message command and capable of being defined in a user profile. For example, the message command may include a relative volume for conveying the message, a type of personality, nationality, or ethnicity, an emotion, and the core meaning of the message. A particular message command may include any combination or any one of the characteristics in addition to the core meaning. As noted, these characteristics may be included in each command, or predefined to modify all messages in the session. Additional commands may be used to set these predefined characteristics for subsequent messages.

For example, the telephony user A may send a message to the text-based user B to say hello and associate a relative volume, with a sad emotional connotation. As such, the audible command may be stated as follows: "volume 'normal,' personality 'east coast,' emotion 'sadness,' meaning 'hi.'" The audio browser 28 will receive corresponding audio and convert the audio to text, which is sent to the IM proxy server 26. The IM proxy server 26 will recognize each characteristic and meaning and create a corresponding text message to send to user B, preferably using predefined profiles. Example profiles are provided in the tables of FIGS. 3 and 4.

With the example command message, the meaning (hi) is associated with given emotion (sadness), which corresponds to phrase 21 in FIG. 3. Based on the east coast style profile for the given personality, and the given volume, the corresponding phrase (21) is associated with an IM text phrase as illustrated in FIG. 4. Thus, for an incoming message command for saying hello with normal volume, east coast personality, and a sadness emotion, the text message "Hi. Not doing well right now. :-(" is sent to user B via computer 24 through the IM server 22.

Notably, the relatively short message command resulted in a traditional IM message to the intended recipient. The particular meaning of the text was expanded based on the profile and was associated with a particular emotion and stated with a given personality. Normal capitalization indicated a normal volume. If a loud volume were requested, the following message would have been sent: ":O HI. NOT DOING WELL RIGHT NOW. :-(" The actual text uses all capital letters to indicate a loud volume. Further, the emoticon ":O" is used to further emphasize volume, wherein the ":-(" emoticon is used to convey sadness in traditional IM form. In addition to or in place of an emoticon conveying sadness, the profile could define all sadness-related text to be provided in blue. Similarly, anger could be conveyed in red. The emotional indicia associated with text may take on any form defined in the profile. This is preferably used in a consistent and reliable form to allow recipients of messages to recognize characteristics associated with the text.

Of further interest, the personality defined for a telephony user further translates or expands on the meaning of a message. For example, a Caribbean hello may take the form of "Hey mon" instead of the east coast "Hi." An aspect of the present invention allows users to communicate with varying styles while using consistent meanings and emotions. In one embodiment, the personality is set for an entire session, and the message commands spoken by the telephony user A will define a meaning and an emotion. Relative volume may be included in each command, but is preferably set at a given relative volume and changed only as desired during messaging for selected messages. Those skilled in the art will recognize the tremendous versatility and configurability of the profiles and characteristics. Further, additional characteristics may be added, and not all embodiments will require or use all of the characteristics described herein. For example, profiles may be set up using only meaning and emotion without regard to personality or volume.

Figure 5:
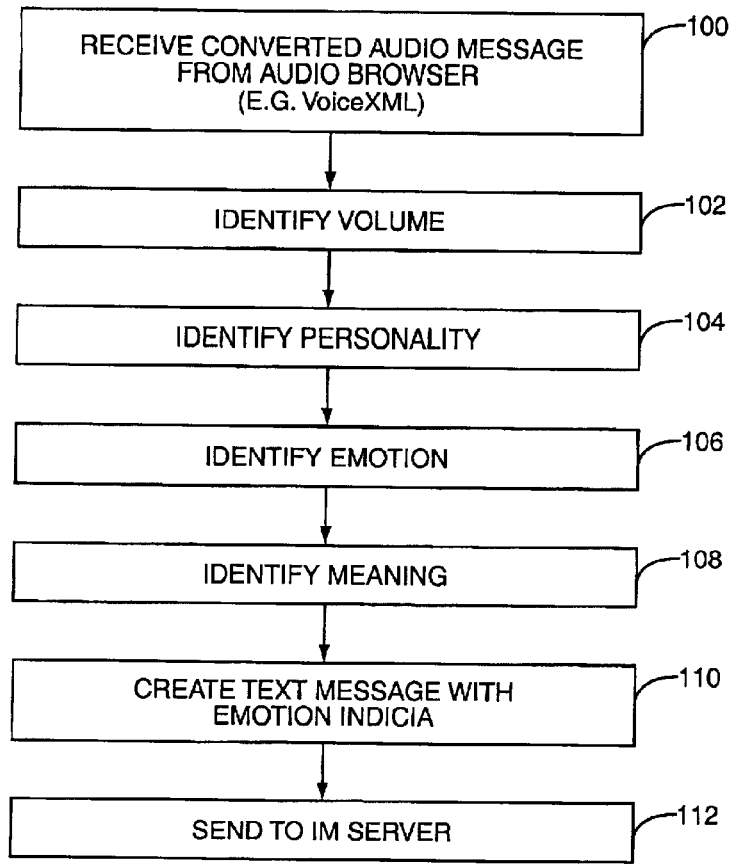
FIG. 5 is a flow diagram for the basic operation of an instant messaging proxy server processing messages directed to an on-line user from a telephony user.

The IM proxy server 26 includes or has access to the profiles via the profile server 32. The basic operation of the IM proxy server 2G is outlined in FIGS. 5 and 6. FIG. 5 outlines the processing of messages directed to the text-based user B from the telephony user A. Initially, text-based messages are converted from audio commands received from the mobile terminal 20 via the audio browser 28 (step 100). From the command message itself, or as previously defined, the IM proxy server 26 may identify a relative volume (step 102), personality (step 104), emotion (step 106), and message meaning (step 108). Based on the identified characteristics and meaning of the message, a text-based IM message is created with the defined emotion indicia in a traditional IM format (step 110), and sent to the IM server 22 (step 112) for delivery to the on-line user B's computer 24.

Figure 6:
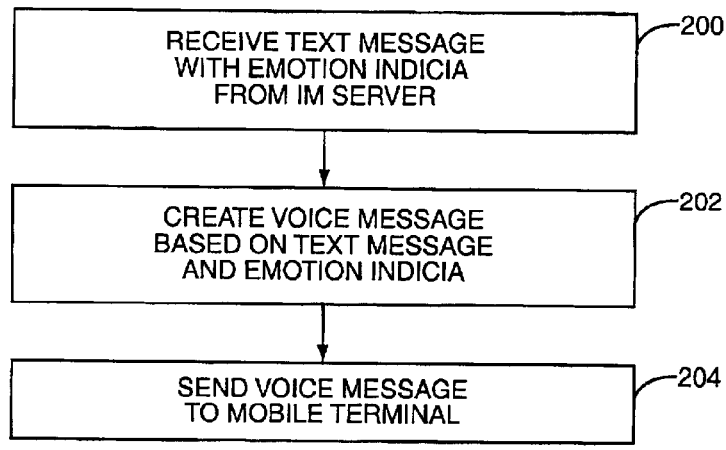
FIG. 6 is a flow diagram for the basic operation of an instant messaging proxy server processing messages directed to a telephony user from an on-line user.

Turning now to FIG. 6, the IM proxy server 26 will process messages directed to the telephony user A as follows. The IM proxy server 26 will receive a text message, preferably with emotion indicia, from computer 24 via the IM server 22 (step 200). Based on the meaning and any ascertainable emotion indicia, a voice message, which is a text-based message readily converted to audio by the audio browser 28, is created (step 202). The voice message is sent to the mobile terminal 20 (step 204) via the audio browser 28, which will convert the text of the voice message to audio, which is delivered to the mobile terminal 20 via the mobile switching center 16 and base station 18.

In general, the IM proxy server 26 and audio browser 28 preferably operate in a client-server configuration using an audio- or voice-capable markup language. The audio browser 28 will interpret the markup language content representing the audio message to send to the telephony user A and deliver the corresponding audio to the telephony user A. Audio from the telephony user A is likewise converted to content for delivery to the IM proxy server 26. The messages sent to the telephony user A from the audio browser 28 may be pre-recorded, may be generated in real-time based on text-to-speech conversion, or may be a combination thereof.

The voice extensible markup language (VoiceXML) is the preferred markup language for interaction between the audio browser 28 and the IM proxy server 26. VoiceXML is an XML document schema developed by the VoiceXML Forum, a group of organizations founded by AT&T, IBM, Lucent Technologies, and Motorola. VoiceXML facilitates web-generated interactions through audio, either pre-recorded or translated from text to speech, and through voice, using speech recognition. Additional information on VoiceXML may be obtained from Motorola, Inc., 1303 East Algonquin Road, Schaumburg, Ill., 60196, or from the VoiceXML Forum, which has a web site at http://www.voicexml.org.

The audio browser 28, which may be referred to as a voice browser, is analogous to traditional, graphical browsers using HTML. The World Wide Web Consortium (W3C) working draft for "An Introduction and Glossary for the Requirement Draft—Voice Browsers," 23 Dec. 1999, provides additional information on voice browsers, and is incorporated herein by reference in its entirety.

As such, the audio browser 28 is the liaison between the telephone network 14 and the IM proxy server 26 of the packet-switched network 12, and operates according to a call dialog established by the markup language. The call dialog is preferably provided to the audio browser 28 in a VoiceXML web page created by the IM proxy server 26. The call dialog will preferably include the necessary information to interact with the telephony user A, and optionally, establish calls to and originated by the telephony user A, as well as report the status of the call or the caller's response.

Preferably, the IM proxy server 26 will generate the necessary call dialog in a VoiceXML page and provide the page to the audio browser 28. The audio browser 28 will execute the call dialog to control communications with the telephony user A via the mobile terminal 20, as well as deliver audio to the mobile terminal 20 corresponding to the instant messages, deliver messages to the IM proxy server 26, and receive audio making up the message commands from the telephony user A. Preferably, the call dialog provided in the form of a VoiceXML page to the audio browser 28 provides the audio browser 28 with sufficient instructions to carry out its translational duties and control communications with the mobile terminal 20 to facilitate instant messaging as described herein.

Thus, the audio browser 28 provides text converted from audio to the IM proxy server 26 in the form of requests for web pages, and the responding web pages may include the text to convert and send to the mobile terminal 20 in an audible format. The VoiceXML pages will also include sufficient instructions to have the audio browser 28 convert incoming audio and request subsequent pages to facilitate ongoing IM. The call dialog provided in the VoiceXML pages may facilitate numerous iterations, instructions, and commands to effectively control the audio browser 28 and the connection with the mobile terminal 20.

Figure 7:
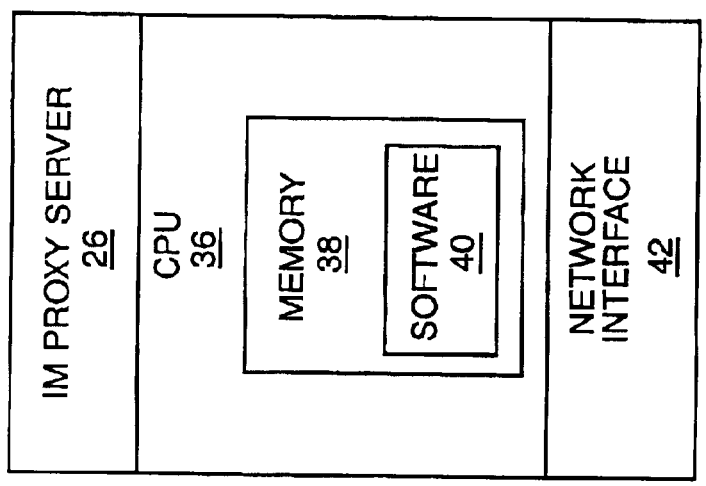
FIG. 7 is a block representation of an instant messaging proxy server constructed according to a preferred embodiment of the present invention.

An exemplary IM proxy server 26 is depicted in FIG. 7. The IM proxy server 26 will preferably include a central processing unit (CPU) 36 having sufficient memory 38 to store the necessary software 40 to operate the server and store associated data. The CPU 36 is associated with a network interface 42 to facilitate packet-switched communications via the packet-switched network 12.

Figure 8:
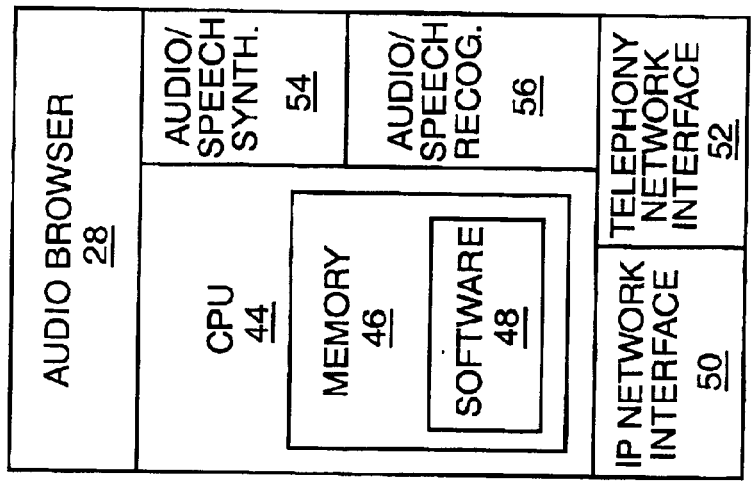
FIG. 8 is a block representation of an audio browser constructed according to a preferred embodiment of the present invention.

FIG. 8 is a block representation of an audio browser 28, which will typically include a CPU 44 associated with memory 46 and the requisite software 48 to control operation. The CPU 44 is also associated with an IP network interface 50 for communicating with network devices, such as the IM server 22, the profile server 32, and the IM proxy server 26. A telephony network interface 52 is provided for interaction with the telephony network 14, and in particular, a local exchange or mobile switching center 16, to facilitate circuit-switched communications over the telephony network 14. The telephony network interface 52 preferably supports a primary rate interface (PRI), T1, or like interface, to allow the audio browser 28 to directly communicate with telephony devices, such as the mobile terminal 20, via direct or wireless switching systems. Alternatively, various Voice Over IP (VoIP) interfaces may be used.

In order to recognize and inject audio, such as tones and speech, the audio browser 28 is preferably configured with an audio or speech synthesizer 54 and audio or speech recognition software/hardware 56. The speech synthesizer 54 is used to generate audio instructions and messages for the telephony user A. Notably, the audio browser 28 may use pre-recorded audio to provide messages to the called party based on instructions from the IM proxy server 26, or may convert textual content to speech. The speech recognition software/hardware 56 is configured to recognize speech of the telephony user A during a communication session, or to recognize tones, such as those generated from key presses of a telephony device, such as mobile terminal 20. As noted above, the audio browser 28 preferably uses VoiceXML as a liaison between audio or speech, both spoken and recognized, and the data representing the speech that is sent to and from the IM proxy server 26. The audio browser 28 may include server processes in addition to the normal client processes of a traditional browser to facilitate the IM function and communications with the telephony user A.

An overall communication flow diagram is outlined in general in FIGS. 9A, 9B, and 9C. The communication flow represents the telephony user A logging in to an IM service by initiating a call via the mobile terminal 20 and hanging up after login. Subsequently, on-line user B, via computer 24, will log in to the IM service. Upon user B logging in to the service, an alert is sent to user A via the mobile terminal 20 and messages are sent between the mobile terminal 20 and user B's computer 24.

As such, telephony user A will initiate a login by having mobile terminal 20 dial a number for logging in to the IM service via audio browser 28 (step 300). Preferably, the audio browser 28, when called via the login number, will automatically answer the call, and via caller identification or by having telephony user A speak or otherwise enter login information, will effectively log user A into the IM proxy web server 26 by requesting a VoiceXML page configured to facilitate login (step 302). Based on the request, the IM proxy web server 26 will lookup or access user A's profile (step 304) and effect a login for telephony user A for an IM service at IM web server 22 (step 306). Preferably, the IM web server 22 will interact with the IM proxy web server 26 as if it were another computer logging in to a standard IM service.

Typically, the IM web server 22 will confirm the login by sending a confirmation message to the IM proxy web server (step 308), which will effectively reply to the original web page request by sending a web page providing the login confirmation in a VoiceXML format to the audio browser 28 (step 310). Assuming that on-line user B was not logged in to the IM service, the audio browser 28 may hang up or otherwise end the circuit-switched call between the mobile terminal 20 and the audio browser 28 (step 312). Those skilled in the art will recognize that the call may continue and facilitate IM as described below if an IM partner is immediately available for messaging.

Assume that on-line user B subsequently decides to check the IM service in which telephony user A routinely participates. As such, on-line user B will log in to the IM web server 22 from computer 24 (step 314). In traditional fashion, the IM web server 22 will confirm the log in to computer 24 (step 316) or otherwise ready itself to receive a message for delivery from user B. In such case, user B may send a message directed to telephony user A via the IM web server 22 (step 318).

The IM server 22, whether user B simply logged in or decided to send a message, may then send an alert to telephony user A via the IM proxy server 26 (step 320) as if the IM proxy server 26 was the device facilitating the messaging for telephony user A. In response, the IM proxy server 26 will alert telephony user A that on-line user B is logged in or that there is a message waiting for delivery. The IM proxy server 26 may alert telephony user A in any number of ways. For example, the IM proxy server 26 may cause a short message service (SMS) message to be sent to the mobile terminal 20 by sending a proper instruction to an SMS gateway 30 (step 322). The SMS gateway 30 will then forward the message using the SMS message directly to the mobile terminal 20 via the telephone network 14 (step 324). The mobile terminal 20 will then display the SMS message to telephony user A, and telephony user A can respond by dialing in to the proper number associated with the audio browser 28 (step 330).

Alternatively, the IM proxy server 26 may instruct the audio browser 28 to initiate a call to the mobile terminal 20 (step 326). The audio browser 28 will then dial the number associated with the mobile terminal 20 to establish a circuit-switched connection and provide the alert or message to telephony user A via the mobile terminal 20 (step 328).

If the IM proxy server 26 does not directly initiate a call to the mobile terminal 20, but instead sends some form of message, such as the SMS message, an email, a page, or other messaging service outside of the IM function, to alert telephony user A of on-line user B's login or pending message, the mobile terminal 20 may be configured to dial a number to effect a circuit-switched connection with the audio browser 28 (step 330). As noted, the audio browser 28, when accessed via a select number, will preferably automatically connect to the IM proxy server 26 (step 332), which will ready itself for the IM session.

Accordingly, telephony user A via the mobile terminal 20 will send an audio message directed to user B to the audio browser 28 (step 334). The audio browser 28 will then convert the audio message, which is preferably made up of audible commands as described above, and convert these audible commands into a corresponding text message to the IM proxy server 26 (step 336). The IM proxy server 26 will translate the text commands to corresponding text or phrases with associated emotional indicia, such as emoticons, emphasis, or colored fonts (step 338).

The text-based phrases with the emotional indicia are sent to the IM server 22 as an IM message (step 340), which is forwarded to the on-line user B via computer 24 in traditional fashion (step 342). On-line user B may respond with a corresponding text message (step 344) by sending a message directed to telephony user A. The message is received by the IM web server 22 (step 346), and sent to the IM proxy web server 26 (step 348). The IM proxy web server 26 will translate the message, which may include its own emotional indicia, into corresponding VoiceXML text or content capable of being converted to audio by the audio browser 28 (step 350). The translated message is then sent to the audio browser 28, preferably in the form of a VoiceXML page (step 352). The audio browser 28 will convert the content to corresponding audio and deliver the audio to the mobile terminal 20 for receipt by the telephony user A (step 354). Steps 344 through 354 will repeat to facilitate message delivery until one or more of the users decide to log off.

Notably, the above example provides a few select scenarios for initiating and facilitating instant messaging. Those skilled in the art will recognize that multiple users may participate, wherein messages are sent to multiple parties simultaneously. Although the audio browser 28 is set up as a client for the IM proxy web server 26 in one embodiment, various protocols and communication techniques may be used to communicate information between the audio browser 28 and the IM proxy web server 26. Further, the audio browser 28 may support any type of markup language capable of supporting voice interaction with telephone terminals and may be configured to generate various types of requests for content from the IM proxy web server 26. Those skilled in the art will recognize that various types of executable content may be provided to run on the audio browser 28 or the IM proxy web server 26 to facilitate updates and additional requests corresponding to alerts, messages, and the like.

The present invention provides for telephony users to participate in IM sessions in an effective manner without requiring reconfiguration of the IM service itself. Further, participants using telephony terminals may effectively receive and convey emotional indicia during these sessions to allow a full complement of IM interaction as expected during these sessions. In alternative embodiments, the mobile users may take on different personalities and character traits and still make use of a reasonable command and meaning set by defining or selecting various profiles. These profiles may be configured to translate select words, phrases, or commands to virtually any desired text. Profiles also allow ready access and delivery of emotional indicia on a per-message or per-session basis. Thus, the present invention not only provides an effective communication form, but also allows participants to remain anonymous and take on various personalities, ethnicities, or character traits as desired.

In another embodiment, audio is received from a telephony user and converted directly to text, which is used to create an instant message to send to the user. In return, text in messages is converted to corresponding audio and sent to the telephony user. The audio from the telephony user may or may not include an audio command including a message meaning with a message characteristic. If provided, the audio command may be used to create all or a portion of the instant message based on the message meaning and message characteristic.

Those skilled in the art will recognize improvements and modifications to the preferred embodiments of the present invention. All such improvements and modifications are considered within the scope of the concepts disclosed herein and the claims that follow.

What is claimed is:

1. A method for facilitating instant messaging for a telephony user comprising:

creating a call dialog;

receiving, according to the call dialog, a command derived from an audio command provided by a telephony user, the command including a message meaning and at least one message characteristic;

searching a profile that defines how the at least one message characteristic acts on said message meaning and affects how said message meaning is presented to a second user;

creating an instant message having content based on the message meaning and the at least one message characteristic and whose appearance and content is affected at least in part by the at least one message characteristic; and sending the instant message to a second user via an instant messaging service.

2. The method of claim 1 wherein providing a profile comprises providing a profile that defines a personality and wherein said message meaning is presented, at least in part, according to said personality.

3. The method of claim 2 wherein the profile includes a plurality of unique text associated with a plurality of possible message characteristics for a given message meaning and wherein the creating an instant message step forms the at least a portion of the instant message with a chosen one of the plurality of unique text associated with a chosen one of the plurality of possible message characteristics.

4. The method of claim 1 wherein the audio command includes a second message characteristic, and wherein the second message characteristic relates to emotion and the creating step further comprises associating emotional indicia with text corresponding to the message meaning.

5. The method of claim 4 wherein the emotional indicia is at least one of the group consisting of an emoticon, emphasis imparted in at least a portion of the text corresponding to the message meaning, and color imparted in at least a portion of the text corresponding to the message meaning.

6. The method of claim 2 wherein when the message is presented, at least in part, according to said personality, the message is presented by selecting text corresponding to the message meaning for said personality.

7. The method of claim 4 wherein the second message characteristic relates to a relative volume and the creating step further comprises selecting a text format for the instant message corresponding to the relative volume.

8. The method of claim 4 wherein second message characteristics of the group consisting of volume, and emotion are available to associate with the message meaning of the command and the message meaning is associated with one or more of the message characteristics.

9. The method of claim 8 wherein at least one message characteristic is predefined for the command and is associated with the message meaning of the command in the creating step.

10. The method of claim 1 further comprising:

receiving an instant message from the second user via the instant messaging service;

creating content capable of being converted to an audio message to deliver to the telephony user; and sending the content to the telephony user via an audio browser.

11. The method of claim 10 further comprising receiving and converting the content directed to the telephony user into an audible message and delivering the audible message to the telephony user.

12. The method of claim 1 further comprising sending an alert to the telephony user via at least one of the group consisting of calling, sending an email, sending a message via a short message service, and sending a page.

13. A system for facilitating instant messaging for a telephony user comprising:

a communication interface for communicating with an instant messaging service and a device capable of communicating with the telephony user; and a control system associated with the communication interface and adapted to:

creating a call dialog;

receive, according to the call dialog, a command derived from an audio command provided by the telephony user, the command including a message meaning and at least one message characteristic;

search a profile that defines how the at least one message characteristic acts on said message meaning and affects how said message meaning is presented to a second user;

create an instant message based on the message meaning and the at least one message characteristic and whose appearance and content is affected at least in part by the at least one message characteristic; and send the instant message to a second user via the instant messaging service.

14. The system of claim 13 wherein the profile includes a plurality of unique text associated with a plurality of possible message characteristics for a given message meaning and wherein the control system is adapted to create the instant message by forming at least a portion of the instant message with a chosen one of the plurality of unique text associated with a chosen one of the plurality of possible message characteristics.

15. The system of claim 13 wherein the message characteristic relates to emotion and the control system is adapted to create the instant message by associating emotional indicia with text corresponding to the message meaning.

16. The system of claim 15 wherein the emotional indicia is one of the group consisting of an emoticon, emphasis imparted in at least a portion of the text corresponding to the message meaning, and color imparted in at least a portion of the text corresponding to the message meaning.

17. The system of claim 13 wherein the message characteristic relates to personality and the control system is further adapted to create the instant message by selecting text corresponding to the message meaning for a given personality.

18. The system of claim 13 wherein the message characteristic relates to a relative volume and the control system is further adapted to create the instant message by selecting a text format for the instant message corresponding to the relative volume.

19. The system of claim 13 wherein message characteristics of the group consisting of volume, personality, and emotion are available to associate with the message meaning of the command and the control system is further adapted to create the instant message by associating the message meaning with one or more of the message characteristics.

20. The system of claim 19 wherein at least one message characteristic is predefined for the command and the control system is further adapted to create the instant message by associating the message meaning with the at least one predefined message characteristic.

21. The system of claim 13 wherein the control system is further adapted to:

receive an instant message from the second user via the instant messaging service;

create content capable of being converted to an audio message to deliver to the telephony user; and send the content to the telephony user via an audio browser.

22. The system of claim 13 further comprising an audio browser adapted to convert content directed to the telephony user into an audible message and deliver the audible message to the telephony user via the audio browser.

23. The system of claim 13 wherein said control system is further adapted to send an alert to the telephony user via at least one of the group consisting of calling, sending an email, sending message via a short message service, and sending a page.

24. A computer readable medium with software facilitating instant messaging for a telephony user and comprising instructions for a computer to:

create a call dialog;

receive, according to the call dialog, a command derived from an audio command provided by the telephony user, the command including a message meaning and at least one characteristic;

search a profile that defines how the at least one message characteristic acts on said message meaning and affects how said message meaning is presented to a second user;

create an instant message based on the message meaning and the at least one message characteristic and whose appearance and content is affected at least in part by the at least one message characteristic; and send the instant message to a second user via an instant messaging service.

* * * * *